United States Patent
Rentfrow

(10) Patent No.: US 11,353,097 B2
(45) Date of Patent: Jun. 7, 2022

(54) ELECTRIC MACHINE WITH FLUID COUPLING

(71) Applicant: SCHAEFFLER TECHNOLOGIES AG & CO. KG, Herzogenaurach (DE)

(72) Inventor: Peter Rentfrow, Doylestown, OH (US)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 61 days.

(21) Appl. No.: 16/783,687

(22) Filed: Feb. 6, 2020

(65) Prior Publication Data
US 2021/0246974 A1 Aug. 12, 2021

(51) Int. Cl.
F16H 45/02 (2006.01)
H02K 7/00 (2006.01)
F16H 63/30 (2006.01)

(52) U.S. Cl.
CPC .......... *F16H 45/02* (2013.01); *F16H 63/304* (2013.01); *H02K 7/003* (2013.01); *F16H 2045/0247* (2013.01); *F16H 2045/0284* (2013.01)

(58) Field of Classification Search
CPC .... F16H 45/02; F16H 2045/002–0284; H02K 9/00–28; B60K 6/387; B60K 6/383; B60K 6/40; B60K 6/48
See application file for complete search history.

(56) References Cited

U.S. PATENT DOCUMENTS

| | | | |
|---|---|---|---|
| 5,789,823 A * | 8/1998 | Sherman | B60K 6/383 290/47 |
| 7,509,802 B2 * | 3/2009 | Hammond | B60K 6/26 60/330 |
| 8,496,561 B2 | 7/2013 | Bucknor et al. | |
| 2005/0103593 A1 * | 5/2005 | Tanaka | F16D 33/18 192/57 |
| 2014/0144742 A1 * | 5/2014 | Sperrfechter | B60K 6/405 192/3.29 |
| 2020/0039496 A1 * | 2/2020 | Lindemann | B60K 6/387 |
| 2020/0040976 A1 * | 2/2020 | Steiner | B60K 6/387 |

* cited by examiner

*Primary Examiner* — Ernesto A Suarez
*Assistant Examiner* — Lillian T Nguyen
(74) *Attorney, Agent, or Firm* — Rutan & Tucker LLP; Hani Z. Sayed

(57) ABSTRACT

A powertrain includes an electric machine including a rotor defining a hollow center and a fluid-coupling assembly at least partially disposed within the hollow center. The fluid-coupling assembly includes an input shaft, a turbine fixedly coupled to the rotor and having a hub configured to connect with a transmission input shaft, and an impeller configured to fluid couple with the turbine. The impeller is selectively coupled to the rotor and selectively coupled to the input shaft.

12 Claims, 4 Drawing Sheets

ELECTRIC MACHINE WITH FLUID COUPLING

TECHNICAL FIELD

The present disclosure relates to electric powertrains and more specifically to electric machines having an integrated fluid coupling.

BACKGROUND

An electric powertrain includes an electric machine (motor) configured to power driven wheels of the vehicle. In the case of a hybrid vehicle, the electric powertrain also includes an internal-combustion engine coupled to the electric machine. The powertrain includes a gearbox having one or more gear ratios. The electric powertrain may include a fluid coupling. A common fluid coupling is a torque converter.

SUMMARY

According to one embodiment, a powertrain includes an electric machine including a rotor defining a hollow center and a fluid-coupling assembly at least partially disposed within the hollow center. The fluid-coupling assembly includes an input shaft, a turbine fixedly coupled to the rotor and having a hub configured to connect with a transmission input shaft, and an impeller configured to fluid couple with the turbine. The impeller is selectively coupled to the rotor and selectively coupled to the input shaft.

According to another embodiment, an electric machine assembly with integrated fluid coupling includes an electric machine having a rotor defining a hollow center, an input shall, and a fluid-coupling assembly. The fluid-coupling assembly is at least partially disposed within the hollow center. The assembly includes a turbine fixedly coupled to the rotor, an impeller configured to fluid couple with the turbine, and a clutch assembly configured to selectively couple the impeller to the rotor and selectively couple the impeller to the input shaft.

According to yet another embodiment, an electric machine assembly with integrated fluid coupling includes an electric machine having a rotor, an input shaft supported for rotation within the rotor, and a fluid-coupling assembly. The fluid-coupling has a turbine fixedly coupled to the rotor and an impeller. A clutch assembly is configured to selectively couple the impeller to the input shaft and to selectively couple the impeller to the rotor.

In alternative embodiments, the clutch assembly may only include a single clutch (or clutch pack) disposed in the fluid-coupling assembly. An additional clutch that selectively couples the engine may be provided outside of the electric-machine housing. In some embodiment, this additional clutch may be omitted.

DETAILED DESCRIPTION

Figure 1:
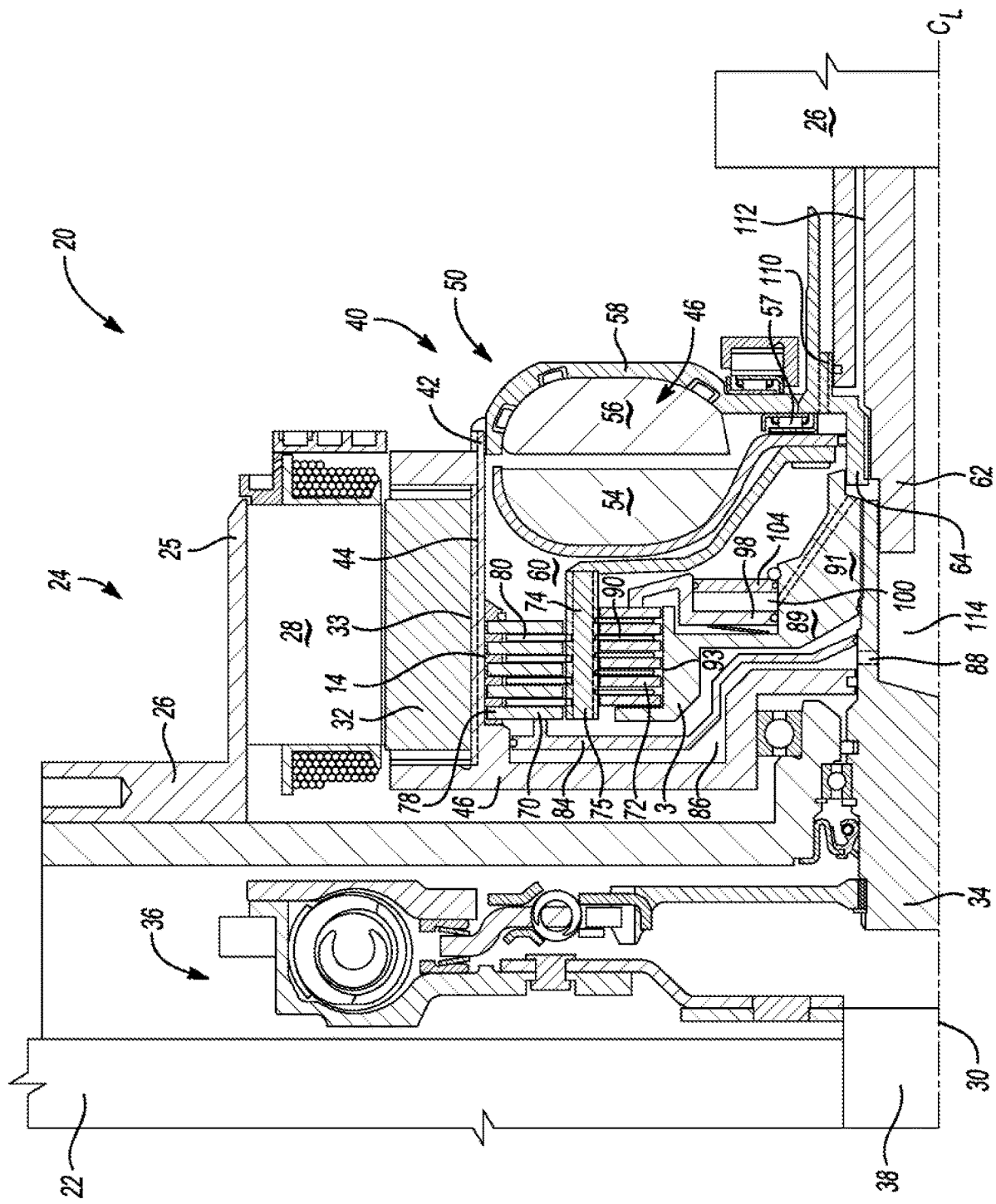
FIG. 1 is a schematic cross-sectional view of a hybrid powertrain.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Figure 2:
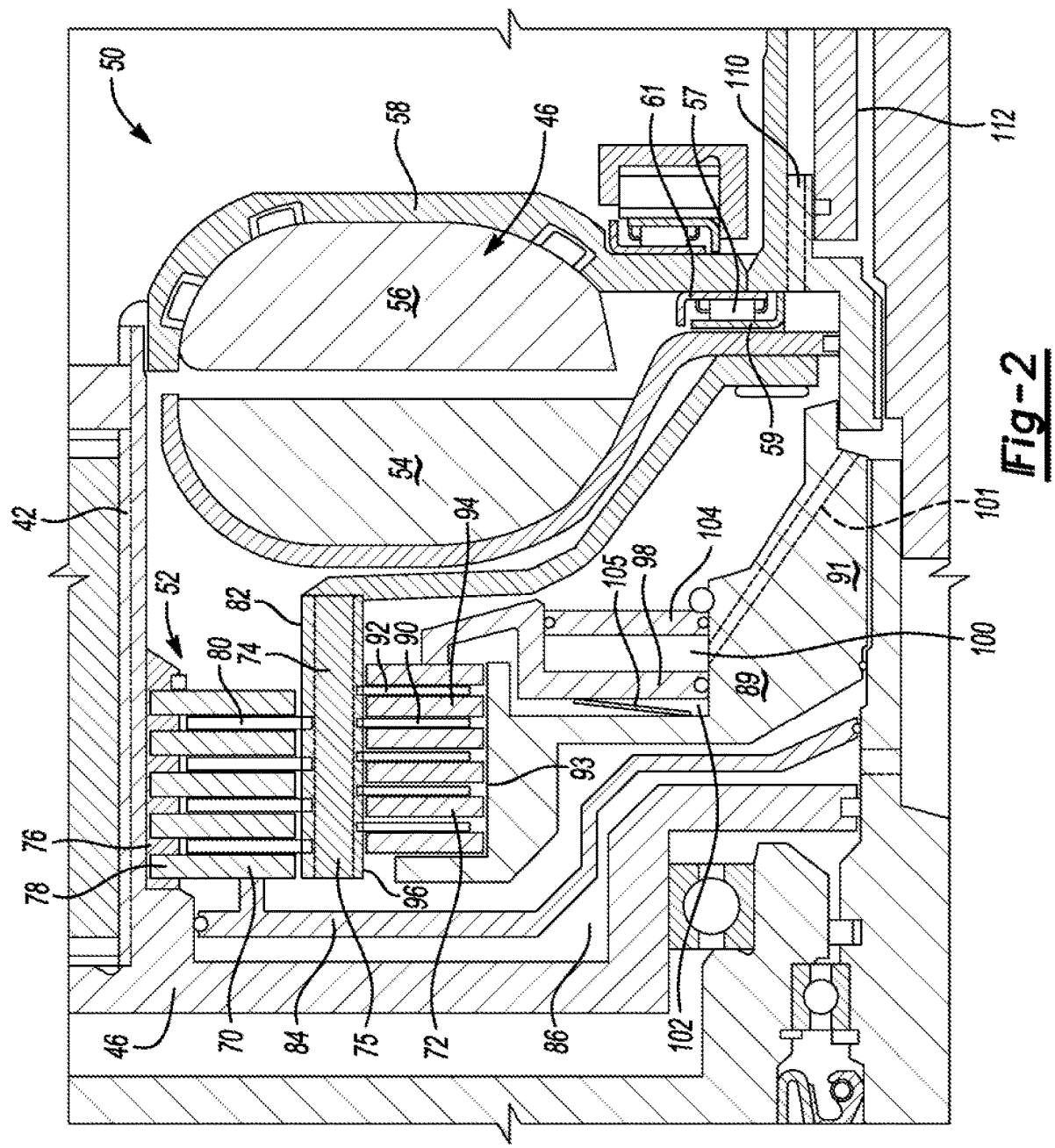
FIG. 2 is a magnified view of a fluid coupling assembly of FIG. 1.

Referring to FIGS. 1 and 2, a hybrid powertrain 20 includes an engine 22, an electric machine 24, and a transmission 26. The powertrain 20 is driveably connected to driven wheels of a vehicle. The powertrain 20 is configured to power the wheels with torque produced by the engine 22, the electric machine 24, or both. The hybrid powertrain 20 may include an engine-only mode in which the driven wheels are powered only by the engine 22, an electric mode in which the engine 22 is OFF and the driven wheels are powered only by the electric machine 24, and a hybrid mode in which both the engine 22 and the electric machine 24 power the wheels. The engine 22 may be used to charge the electric machine 24. In some embodiments, the electric machine 24 may be used to start the engine 22. Alternatively, a dedicated starter motor (not shown) may be used to start the engine 22.

The electric machine 24 may be configured to act a motor to produced torque for driving the driven wheels and to act as a generator to produce electricity for charging a traction battery, such as during regenerative braking. The electric machine 24 may be an alternating-current (AC) machine such as a three-phase AC machine. The electric machine 24 includes a housing 25, a stator 28 fixed to the housing 25, and a rotor 32 supported within the stator 28 for rotation about a centerline 30 of the electric machine. The electric machine 24 includes input shaft 34 configured to connect with the engine 22. A damper 36 may be used to connect the input shaft 34 to the crankshaft 38 of the engine 22.

The powertrain 20 includes a launch device between the actuators (i.e. the engine 22 and the electric machine 24) and the transmission 26. The launch device facilitates smooth starting of the vehicle from rest among other duties. A fluid coupling is one example launch device. A fluid coupling is a device that transfers torque from one component to another utilizing hydrokinetic energy. A fluid coupling includes a drive component, commonly called an impeller, and a driven component, commonly called a turbine, that is driven by the drive component.

In the powertrain 20, the fluid coupling is integrated with the electric machine 24. That is, a majority of the components of the fluid coupling are disposed within the hollow center 33 (inner diameter) of the rotor 32. For example, the electric machine 24 may include a fluid-coupling assembly 40 mostly disposed within the hollow center 33 of the rotor.

The fluid-coupling assembly 40 includes a case 42 that is attached to and disposed within the hollow center 33 of the rotor 32. The case 42 may be cylindrical having an axially extending portion 44 and a radially extending portion 46. The axially extending portion 44 and/or the radially extending portion 46 may be attached to the rotor 32. The rotor 32 may be supported by the case 42 and, in a sense, the case 42 may be a rotor shaft.

The fluid-coupling assembly 40 further includes a fluid coupling 50, a clutch assembly 52, and other related components. The fluid coupling 50 may include an impeller 54 supported for rotation within the rotor 32 and a turbine 56 fixedly coupled to the rotor 32. A group of rotating elements are fixedly coupled to one another if they are constrained to rotate as a unit in all operating conditions. Rotating elements can be fixedly coupled by spline connections, welding, press fitting, machining from a common solid, damper connections, or other means. Slight variations in rotational displacement between fixedly coupled elements can occur such as displacement due to lash or shaft compliance and damper oscillations. One or more rotating elements that are all fixedly coupled to one another may be called a shaft. In contrast, two rotating elements are selectively coupled when the elements are constrained to rotate in unison in a first condition and are free to rotate at unrelated speeds in one or more other conditions. For example, a clutch selectively couples two components by constraining them to rotate as a unit when fully engaged and permitting rotation at unrelated speeds when slipping or disengaged. A thrust bearing 57 may be provided between the turbine 56 and the impeller 54. The bearing 57 may include a first race 59 disposed against the impeller 54 and a second race 61 disposed against the turbine 56. As discussed above, the fluid-coupling assembly 40 is mostly disposed within the hollow center 33 of the rotor. For example, the clutch assembly 52 and the impeller 54 may be disposed in the hollow center 33, whereas the turbine 56 is partially outside of the hollow center 33.

The impeller 54 and the turbine 56 each includes vanes (blades) configured to create the fluid coupling. In the illustrated embodiment, the turbine 56 is connected to the case 42 such as by welding. The turbine 56 may include a shell 58 having an outboard portion attached to the radially extending portion 46. The shell 58 is opposite the radially extending portion 46 to close-off the back side of the case 42. The shell 58 may be considered a portion of the case 42. The case 42 and the turbine shell 58 cooperate to define a hydrodynamic chamber 60. The hydrodynamic chamber 60 is filled with oil, such as transmission fluid supplied from a valve body of the transmission 26. During operation, the impeller 54 fluidly couples with the turbine 56 to transfer torque from the impeller 54 to the turbine 56. The impeller 54 is configured to receive power from the actuators, and the turbine 56 is connected to an input shaft 62 of the transmission 26. For example, the turbine 56 includes a turbine hub 64 splined to the transmission input shaft 62.

The clutch assembly 52 selectively couples the impeller 54 to the input shaft 34 and/or to the rotor 32. The clutch assembly 52 may include a first clutch 70 and a second clutch 72. The second clutch 72 selectively decouples the engine 22 from the remaining powertrain. The second clutch 72 may be referred to as a disconnect clutch as it isolates the engine 22 when fully disengaged (open). The first clutch 70 couples the impeller 54 to the case 42. The first clutch 70 may be referred to as a bypass clutch (or a lockup clutch) as it rotationally locks the impeller 54 to the turbine 56 via the ease 42. The first and second clutches 70, 72 may be arranged in a radially stacked configuration (as shown) with the first clutch 70 circumscribing the second clutch 72. The clutches 70, 72 may be hydraulically controlled such that the clutches are independently operable to place the powertrain 20 in a plurality of different modes. This will be described below in greater detail.

The first clutch 70 may include a clutch pack 76 (as shown) or may be a single disc clutch. The clutch pack 76 may include a plurality of clutch plates 78 grounded to the case 42, such as by a spline connection, and a plurality of clutch discs 80 interleaved with the clutch plates 78. The clutch discs 80 may include a friction material disposed on the faces. Alternatively, the friction material may be disposed on the clutch plates 78. The clutch discs 80 are fixedly coupled to the impeller 54. For example, an impeller shell 74 connects the clutches 70, 72 to the impeller 54. The impeller shell 74 is fixedly coupled to the impeller 54. The impeller shell 74 includes an axially extending rim 75 having an outer circumferential surface 82 and an inner circumferential surface 96. The clutch discs 80 are grounded to the outer circumferential surface 82, e.g., by a spline connection. The clutch pack 76 is engaged and disengaged by stroking a hydraulic piston 84. The clutch 70 includes an apply chamber 86 disposed between the radially extending portion 46 and the piston 84. The apply chamber 86 is isolated from the hydrodynamic chamber 60. Two chambers are considered to be fluidly isolated if they are capable of having meaningfully different pressures. The apply chamber 86 receives oil, such as transmission fluid, via one or more orifices 88 defined in the input shaft 34. The clutch 70 is engaged by flowing oil to the apply chamber 86 to stroke the piston 84 towards the clutch pack 76 creating frictional engagement between the clutch plates 78 and the clutch discs 80. This selectively couples the impeller shell 74 to the case 42, which results in the impeller 54 rotating in unison with the rotor 32.

The second clutch 72 includes an annular abutment 89 that is supported on the input shaft 34. A hub 91 of the annular abutment 89 is non-rotatably connected to the input shaft 34, such as by a spline connection. A clutch pack 90 (or single-disc clutch in other embodiments) may be supported on an outer portion of the abutment 89. The clutch pack 90 is disposed between the axially extending rim 75 and an outer circumferential surface 93 of the abutment 89. The second clutch 72 is configured to selectively couple the impeller shell 74 to the abutment 89. The clutch pack 90 may include a plurality of clutch discs 92 grounded to the inner circumferential surface 96 such as by a spline connection, and a plurality of clutch plates 94 interleaved with the clutch discs 92. The clutch discs 92 may include a friction material disposed on the faces. Alternatively, the friction material may be disposed on the clutch plates 94. The clutch plates 94 are fixedly coupled to the outer surface 93.

The clutch pack 90 is engaged and disengaged by stroking a hydraulic piston 98. The clutch 72 may include a washer 104 seated on the abutment 89. The washer 104, the abutment 89, and the piston 98 cooperate to define an apply chamber 100 that is isolated from the hydrodynamic chamber 60. The apply chamber 100 receives oil, such as transmission fluid, via one or more orifices 101 defined in the abutment 89. The clutch 72 is engaged by flowing oil to the apply chamber 100 to stroke the piston 98 towards the clutch pack 90 creating frictional engagement between the clutch plates 94 and the clutch discs 92. This selectively couples the impeller shell 74 to the input shaft 34, which results in the engine 22 being connected to the remaining powertrain 20. In the illustrated embodiment, the pistons 84 and 98 stroke in opposite directions with the piston 84 stroking towards the fluid coupling 50 and the piston 98 stroking towards the engine 22. This may be arranged differently in other embodiments.

The second clutch 72 may include a balance chamber 102 for de-stroking (return) the piston 98. A resilient member 105, such as a wave spring, a diaphragm spring, or the like, may be disposed within the balance chamber 102 to facilitate disengagement of the clutch pack 90. The balance chamber 102 may be disposed between the piston 98 and the abutment 89. Dynamic seals may be utilized to isolate the balance chamber 102 from the hydrodynamic chamber 60. One or more orifices (not shown) may supply oil, such as transmission fluid, to the balance chamber 102.

Oil may be supplied from the transmission 26 to the fluid-coupling assembly 40 via one or more passageways. The hydrodynamic chamber 60 receives oil from a passageway 110 defined through the turbine hub 64. During operation of the powertrain 20, oil may be continuously circulated into and out of the hydrodynamic chamber 60. The fluid may return to the sump through holes or passageways in the housing. The oil within the hydrodynamic chamber 60 is used for lubrication and cooling in addition to being the working fluid of the fluid coupling 50. Additional passageways may be formed in the transmission input shall 62 for controlling the clutch assembly 52. For example, a passageway 112 may connect the valve body of the transmission to the apply chamber 100. The fluid passageway 112 extends along the outer diameter of the transmission shaft 62, through the spline connection at the turbine hub, and into the orifice 101. When the piston 98 is to be stroked, the valve body provides oil to the apply chamber 100. When the piston 98 is de-stroked, oil may travel back to the transmission along the same series of fluid passageways. Another fluid passageway 114 may travel through the hollow center of the transmission input shaft 62. The fluid passageway 114 connects between the valve body and the orifice 88. When the piston 84 is to be stroked, the valve body provides oil to the apply chamber 86. When the piston 98 is de-stroked, oil may travel back to the transmission 26 along the same series of fluid passageways. Seals or the like are provided to isolate the passageways 110, 112, 114.

The powertrain 20 may include a plurality of operating modes such as electric-only mode, engine-only mode, hybrid mode, and engine-starting mode. In electric-only mode, the electric motor is the sole actuator for generating power. In this mode, the engine 22 is disconnected from the electric machine 24 by opening the second clutch 72. Since the turbine 56 is fixedly coupled to the rotor 32, the first clutch 70 can be opened as well creating a purely mechanical power flow path from the rotor 32, through the case 42, and to the turbine 56. In the engine-only mode and in the hybrid mode, second clutch 72 is engaged to connect the engine 22 to the impeller 54. In these modes, multiple power flow paths are possible. Electric-machine power has a mechanical power flow path from the electric machine 24 to the turbine 56, and engine power has a fluid power flow path from the impeller 54 to the turbine 56. The first clutch 70 may also be closed to mechanically couple the engine 22 to the turbine 56 via the case 42. The electric machine 24 may be used to start the engine 22 by closing the clutch 72. Here, power flows from the turbine 56 to the impeller 54 (reverse direction of fluid coupling) to start the engine 22. The first clutch 70 could also be closed during engine start to create a mechanical power flow path between the electric machine 24 and the engine 22.

The electric machine with integrated fluid coupling enables a more compact package than a traditional configuration where the torque converter is separate and in series with the electric machine. Integrating the fluid-coupling assembly 40 within the hollow center 33 of the rotor 32 requires the fluid coupling to have a relatively small diameter compared to traditional torque converters that are external. Heat dissipation of the fluid coupling is a limiting factor in torque capacity. Generally, the smaller the diameter of the torus, the lower the torque capacity. The fluid-coupling assembly 40 has a higher torque capacity, despite its relatively small diameter, due to the turbine 56 being fixedly coupled to the rotor 32. By fixedly coupling the turbine 56 to the rotor 32, the fluid path of the fluid coupling 50 is only required to carry engine torque. Closing the bypass clutch 70 further reduces workload on the fluid coupling 50 resulting in even less heat generation. The result is a compact assembly that is capable of carrying the same torques of traditional configurations.

The above-described powertrain 20 is but one embodiment and others are contemplated. For example, the disconnect clutch can be moved outside of the motor housing as shown in FIG. 3 or alternatively eliminated as shown in FIG. 4.

Figure 3:
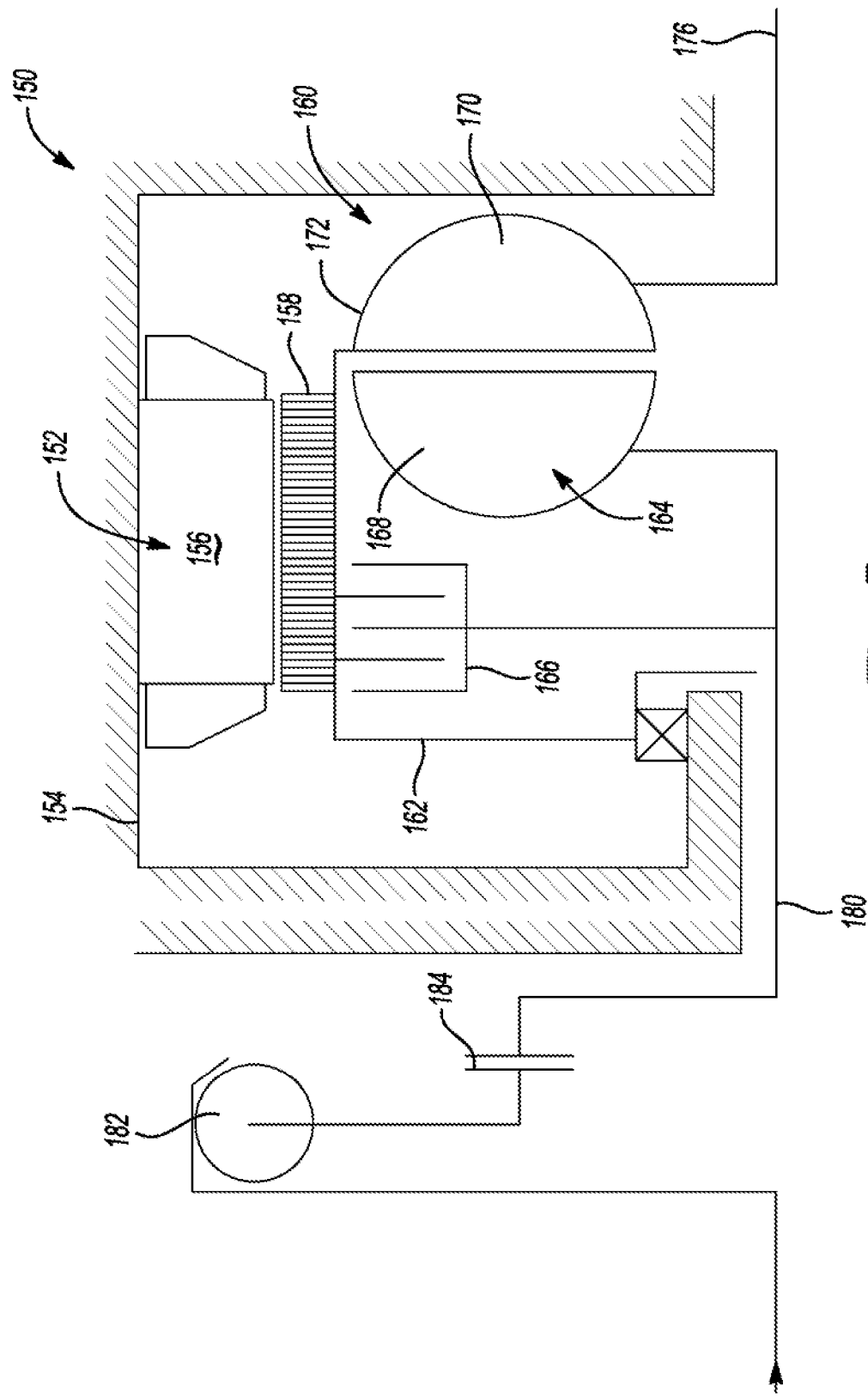
FIG. 3 is a schematic cross-sectional view of another hybrid powertrain.
Figure 4:
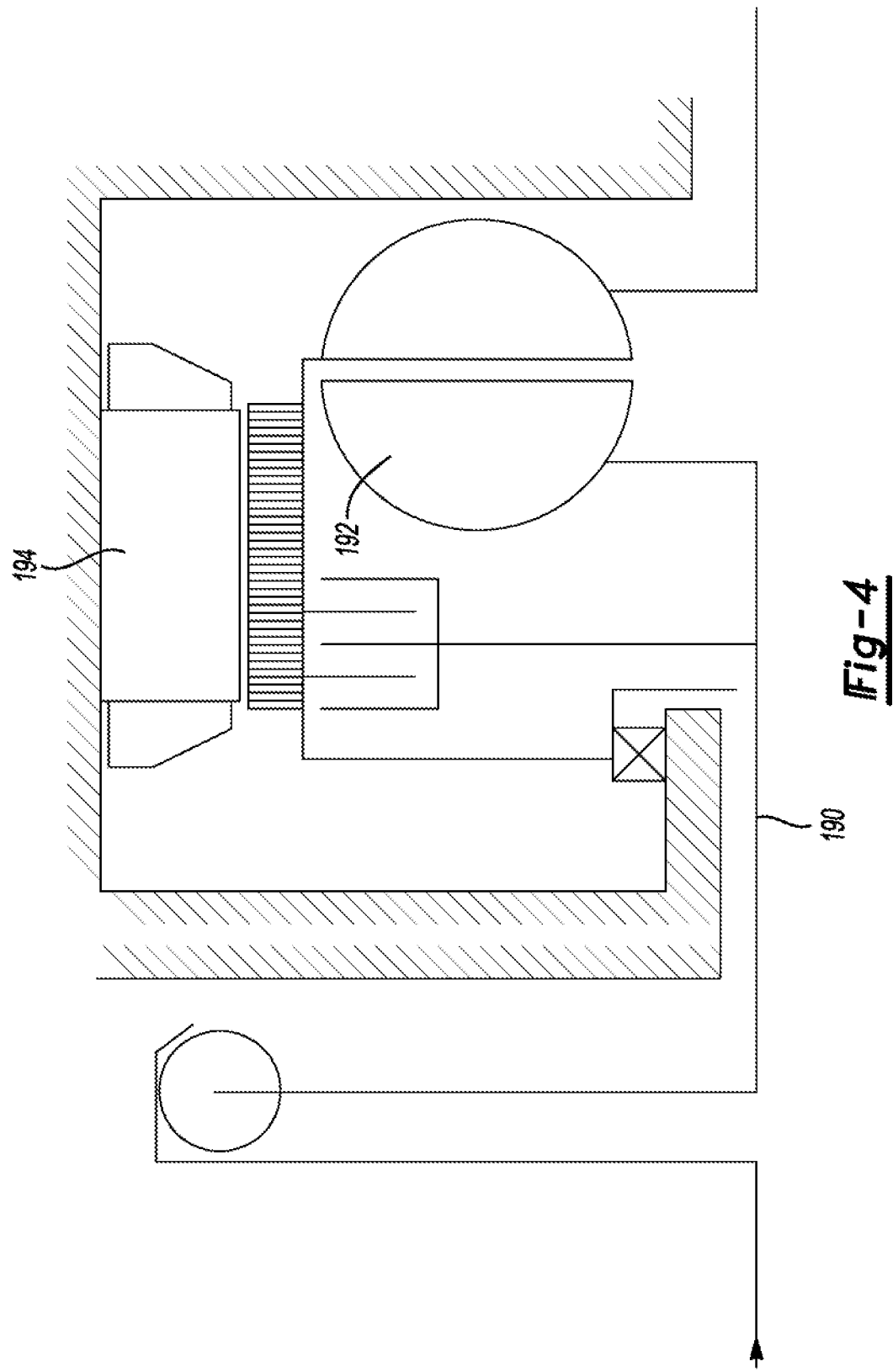
FIG. 4 is a schematic cross-sectional view of yet another hybrid powertrain.

Referring to FIG. 3, a powertrain 150 includes an electric machine 152 having a housing 154, a stator 156, and a rotor 158. A fluid-coupling assembly 160 is disposed in the housing 154. A majority of the components of the fluid-coupling assembly 160 are disposed within the hollow center (inner diameter) of the rotor 158. The fluid-coupling assembly 160 includes a case 162 that is attached to and disposed within the hollow center of the rotor 158. The rotor 158 may be supported by the case 162.

The fluid-coupling assembly 160 further includes a fluid coupling 164, a clutch 166, and other related components. The fluid coupling 164 may include an impeller 168 supported for rotation within the rotor 158 and a turbine 170 fixedly coupled to the rotor 158. The impeller 168 and the turbine 170 each includes vanes (blades) configured to create the fluid coupling. In the illustrated embodiment, the turbine 170 is connected to the case 162 such as by welding. The turbine 170 may include a shell 172 to close-off the back side of the case 162. The shell 172 may be considered a portion of the case 162. The case 162 and the turbine shell 172 cooperate to define a hydrodynamic chamber. The impeller 168 is configured to receive power from the actuators, and the turbine 170 is connected to a shaft 176, such as a transmission input shaft.

The clutch 166 selectively couples the impeller 168 to the rotor 158. The clutch 166 also selectively couples an input shall 180 to the rotor 158. The clutch 166 may be referred to as a bypass clutch or a lockup clutch. The clutch 166 may be hydraulically controlled clutch pack that includes clutch plates grounded to the case 162 and clutch discs grounded to the input shaft 180 similar to the clutch described above.

The input shaft 180 is connected to an actuator, e.g., an engine, by a damper 182 and a disconnect clutch 184. Unlike the above-described disconnect clutch, the clutch 184 is disposed outside of the housing 154. The disconnect clutch 184 selectively couples the actuator to the remaining powertrain. When the disconnect clutch 184 is engaged, the actuator is coupled to the powertrain, and when the disconnect clutch 184 is disengaged, the actuator is isolated. The clutches 166 and 184 can be operated similar to the clutches 70 and 72 to place the powertrain 150 in various operating modes as described above.

FIG. 4 illustrates an alternative embodiment in which the disconnect clutch is omitted. Here, the input shall 190 is always connected to the impeller 192. This design may be used in powertrains in which it is unnecessary to disconnect the actuator, e.g. an engine, from the electric machine 194.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST powertrain 20
engine 22
electric machine 24
housing 25
transmission 26
stator 28
centerline 30
rotor 32
hollow center 33
input shaft 34
damper 36
crankshaft 38
fluid-coupling assembly 40
case 42
axially extending portion 44
radially extending portion 46
fluid coupling 50
clutch assembly 52
impeller 54
turbine 56
thrust hearing 57
turbine shell 58
first race 59
hydrodynamic chamber 60
second race 61
transmission input shaft 62
turbine hub 64
first clutch 70
second clutch 72
impeller shell 74
rim 75
clutch pack 76
clutch plates 78
clutch discs 80
outer circumferential surface 82
piston 84
chamber 86
orifice 88
abutment 89
clutch pack 90
hub 91
clutch discs 92
outer surface 93
outer circumferential surface 93
clutch plates 94
inner circumferential surface 96
piston 98
apply chamber 100
orifice 101
balance chamber 102
washer 104
resilient member 105
fluid passageway 110
fluid passageway 112
fluid passageway 114
powertrain 150
electric machine 152
housing 154
stator 156
rotor 158
fluid-coupling assembly 160
case 162
fluid coupling 164
clutch 166
impeller 168
turbine 170
turbine shell 172
shaft 176
input shaft 180
damper 182
clutch 184
input shaft 190
impeller 192
electric machine 194

What is claimed is:

1. A powertrain comprising:
an electric machine including a rotor defining a hollow center; and
a fluid-coupling assembly at least partially disposed within the hollow center, the assembly including:
an input shaft,
a turbine fixedly coupled to the rotor and having a hub configured to connect with a transmission input shaft, and
an impeller configured to fluidly couple with the turbine, the impeller being selectively coupled to the rotor and selectively coupled to the input shaft, wherein the fluid-coupling assembly further includes:
a first clutch selectively coupling the impeller to the rotor, and
a second clutch selectively coupling the impeller to the input shaft;
wherein the first and second clutch are controlled independently so as to place the powertrain in a plurality of different operating modes, the operating modes comprising at least one of an electric-only mode, engine-only mode, hybrid mode and engine-starting mode,
and wherein the first clutch includes at least one first clutch plate fixedly coupled to the rotor and at least one first clutch disc fixedly coupled to the impeller, and wherein the second clutch includes at least one second clutch plate fixedly coupled to the input shaft and at least one second clutch disc fixedly coupled to the impeller.

2. The powertrain of claim 1, wherein the fluid-coupling assembly further includes a case disposed within the hollow center and supporting the rotor, wherein the turbine is fixed to the case and the impeller is supported for rotation within the case.

3. The powertrain of claim 1, wherein the first clutch and the second clutch are disposed within the hollow center.

4. The powertrain of claim 1, wherein the impeller includes a shell having an outer circumferential surface fixedly coupled to the first clutch disc and an inner circumferential surface fixedly coupled to the second clutch disc.

5. The powertrain of claim 1, wherein the first clutch further includes a first piston and a first apply chamber configured to stoke the first piston, and wherein the second clutch further includes a second piston and a second apply chamber configured to stoke the second piston, and wherein the first clutch is engaged by stroking the first piston towards the turbine, and the second clutch is engaged by stroking the second piston away from the turbine.

6. The powertrain of claim 5, wherein the input shaft defines an orifice in fluid communication with the second apply chamber.

7. The powertrain of claim 1, wherein the fluid-coupling assembly further includes a bearing having a first race disposed against the impeller and a second race disposed against the turbine.

8. An electric machine assembly with integrated fluid coupling, comprising:
an electric machine including a rotor;
an input shaft supported for rotation within the rotor;
a fluid-coupling including a turbine fixedly coupled to the rotor and an impeller; and
a clutch assembly configured to selectively couple the impeller to the input shaft and to selectively couple the impeller to the rotor, and
the clutch assembly further comprising a first clutch that selectively couples the impeller to the input shaft and a second clutch that selectively couples the impeller to the rotor, and
wherein the impeller includes a shell having an outer circumferential surface connected to the first clutch and an inner circumferential surface connected to the second clutch.

9. The electric machine assembly with integrated fluid coupling of claim 8, wherein the clutch assembly and the impeller are disposed within a hollow center of the rotor.

10. The electric machine assembly with integrated fluid coupling of claim 8, wherein the second clutch circumscribes the first clutch.

11. The electric machine assembly with integrated fluid coupling of claim 8, wherein the turbine includes a hub configured to couple with a transmission input shaft.

12. The electric machine assembly with integrated fluid coupling of claim 8 further comprising a case fixed to an inner diameter of the rotor, wherein the turbine is fixed to the case and cooperates with the case to define a hydrodynamic chamber.

* * * * *